United States Patent [19]

Stagner

[11] Patent Number: 5,189,445
[45] Date of Patent: Feb. 23, 1993

[54] READING ASSISTANCE DEVICE AND METHOD

[75] Inventor: Harold W. Stagner, Plainfield, Ind.

[73] Assignee: Special Education Rehab Agency, Inc., Plainfield, Ind.

[21] Appl. No.: 610,257

[22] Filed: Nov. 7, 1990

[51] Int. Cl.⁵ .................................................. G02C 7/16
[52] U.S. Cl. ........................................... 351/46; 351/45
[58] Field of Search .............................. 351/45, 46, 203

[56] References Cited

U.S. PATENT DOCUMENTS

| | | | |
|---|---|---|---|
| 3,199,114 | 8/1965 | Malifaud | 351/45 |
| 3,261,652 | 7/1966 | Magnus | 351/118 |
| 4,542,964 | 9/1985 | Gilson et al. | 351/44 |
| 4,602,856 | 7/1986 | Marks | 351/44 |
| 4,758,079 | 7/1988 | Bledsoe | 351/44 |
| 4,842,400 | 6/1989 | Klein | 351/158 |
| 4,869,584 | 9/1989 | Dion | 351/45 |

FOREIGN PATENT DOCUMENTS

| | | |
|---|---|---|
| 738086 | 12/1932 | France . |
| 444276 | 3/1949 | Italy . |
| 61-121029 | 6/1986 | Japan . |
| 299063 | 3/1964 | Netherlands . |
| 322055 | 7/1957 | Switzerland . |
| 403067 | 5/1933 | United Kingdom . |

OTHER PUBLICATIONS

R. F. Lienbach, M.D., Article entitled "Notes, Cases and Instruments—A Nonmagnifying Reading Aid" (Jun. 1960).

*Primary Examiner*—Rodney B. Bovernick
*Attorney, Agent, or Firm*—Warren L. Franz

[57] ABSTRACT

Reading glasses including side view blocking temples and opaque lenses have narrow horizontal slits for reading focused text while blocking peripheral distractions. The glasses are internally illuminated with uniformly brightly-colored luminescent material to compensate for light deprivation caused by the blocking. In a described embodiment, the opaque lenses are made by applying black pigment to standard prescription lenses and glow-in-the-dark material is applied to the inside of the lenses.

19 Claims, 2 Drawing Sheets

One of the major factors affecting the practicality of a reflector-type solar collector is the question of the tolerances permissible in the construction. The reflector sizes thus far discussed are noticeably larger than the very largest optical telescopes. In order to maintain the "figure" of the mirror within a fraction of a wavelength of the design surface (which is not always a parabola). For this reason, one finds that the cost of these large telescopes, as well as the purpose, is astronomical.

By comparison, the solar collector does not have the requirement that the image be well defined. It is only necessary that the overwhelming majority of the energy strike the boiler. This point is important since even a fraction of the energy collected, if focused upon one of the boiler supports would

-4-

FIG. 4A hin a fraction of a wavelength ign surface (which is not always abola). For this reason, one fin t the cost of these large telesco

FIG. 4B

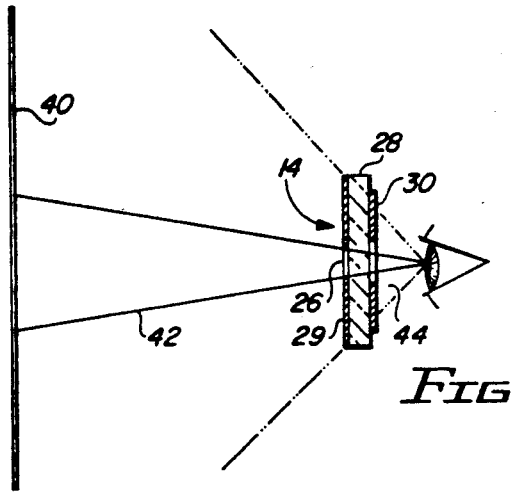

FIG. 5

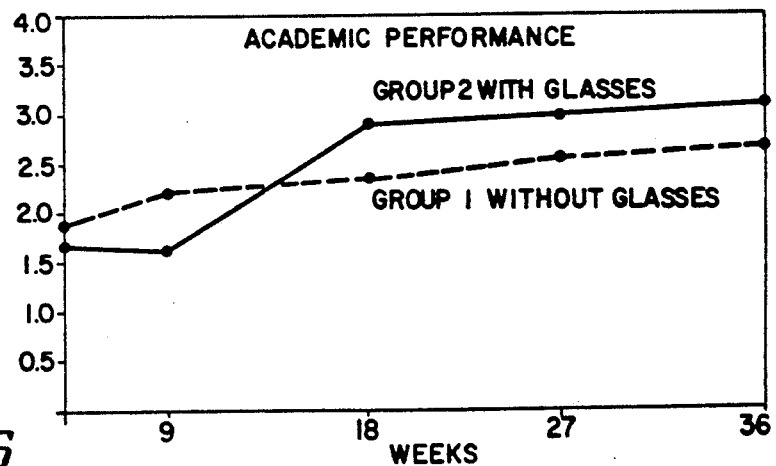

FIG. 6

READING ASSISTANCE DEVICE AND METHOD

This invention relates to a device and method for improving reading comprehension; and, in particular, to a device and method for suppressing peripheral distractions, without depriving the eyes of light.

BACKGROUND OF THE INVENTION

The illiteracy rate in this country is alarming. The percentage of school children experiencing academic problems associated with poor reading skills is high. Adults encounter difficulties in reading concentration. Overall, there is an urgent need to improve reading fluency throughout the whole population.

In order to read and comprehend fluently, a person must first suppress everything except the material desired to be presented for neurological decoding. When the eye sees, however, in addition to focusing on the material being read, unfocused peripheral images are present which have to be ignored. The suppression of unwanted material, such as shapes in the room and lines of text above and below the text being read, consumes needless energy. Moreover, such blurred perceptions from the peripheral regions of the field of view interfere with the reading of the primary focused region subject matter.

It might first appear that using physical barriers to restrict the field of view of vision to just the focused text would increase concentration and, thus, comprehension. However, the opposite might well be true. The eye's natural response to blocking lighted portions of its field of view is to crave light. Moreover, reducing peripheral vision by blocking light can cause claustrophobic reactions and headaches. It is also known that a person's general feeling of well-being may be adversely affected by reducing total illumination intensity.

SUMMARY OF THE INVENTION

It is an object of the present invention to provide a device and method for increasing reading efficiency by reducing outside distractions, conserving eye energy and, thus, increasing productive eye usage in order to improve reading fluency and overall reading comprehension.

It is a further object of the invention to provide a mechanism whereby peripheral field of view reading distractions are suppressed, without depriving the eyes of overall illumination intensity.

In one aspect of the invention, a reading assistance device and method are provided wherein a slitted member is used for admitting light to the eyes from focused portions of a text, while blocking the admission of light from unfocused peripheral portions of the text and surrounding objects, and a source of illumination is used to supply non-specific background light ("white" light) in place of the blocked light.

In a preferred embodiment of the invention, described in greater detail below, a reading aid device in the form of internally illuminated, peripheral view suppressing spectacles or glasses has a frame consisting of a front and two temples. The front has two elongated horizontal open or clear material slits surrounded by light blocking opaque regions. The opaque regions are covered internally with luminous material to provide uniform white background illumination, without shapes or images to cause distraction. In one form, ordinary spectacle lenses are externally coated, except at regions defining the slits, with an opaque material and a luminous phosphorescent glow-in-the-dark substance is applied internally to surround the slits.

BRIEF DESCRIPTION OF THE DRAWINGS

Embodiments of the invention have been chosen for purposes of illustration and are described with reference to the accompanying drawings, wherein:

FIGS. 4A, 4B and 5 are schematic views useful in understanding the method of the invention utilizing the device of FIGS. 1-3; and FIG. 6 is a graph showing the results of an experimental study demonstrating the utility of the device and method of the invention.

Throughout the drawings, like elements are referred to by like numerals.

DESCRIPTION OF PREFERRED EMBODIMENTS

Figure 1:
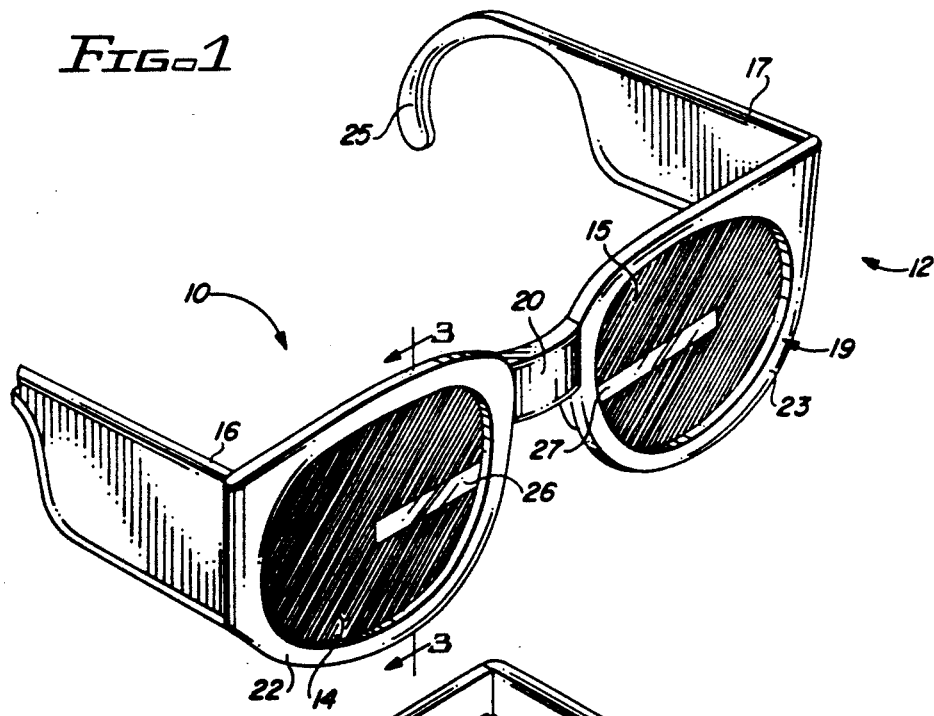
FIG. 1 is a front perspective view of an embodiment of a reading assistance device in accordance with the invention.
Figure 2:
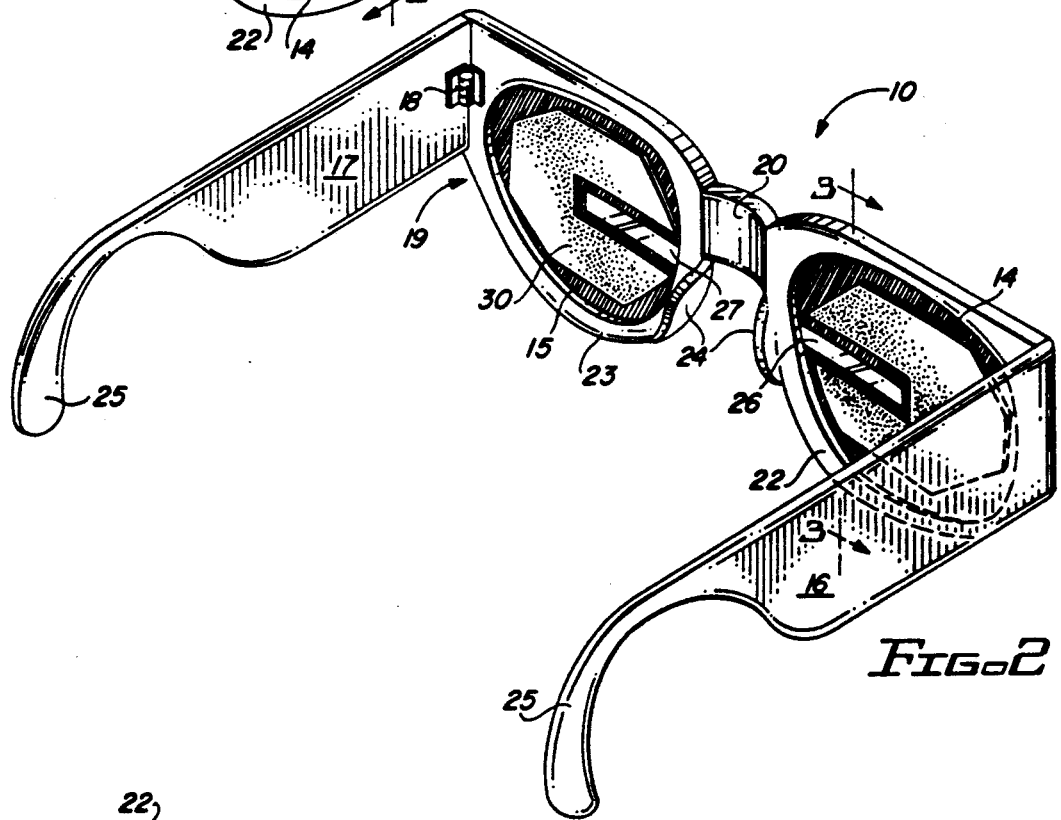
FIG. 2 is a rear perspective view of the embodiment of the device of FIG. 1.
Figure 3:
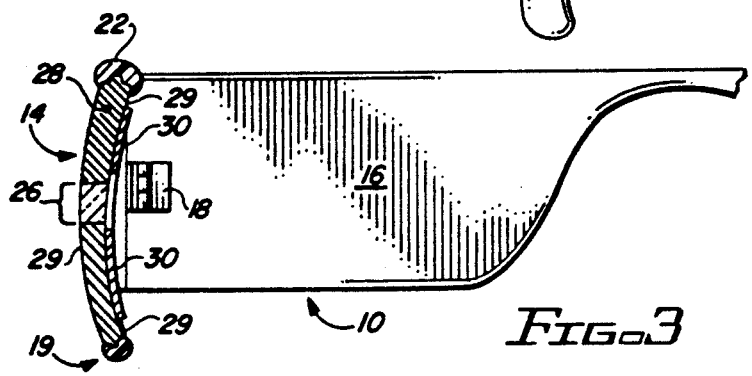
FIG. 3 is a section view taken along the lines 3—3 of FIGS. 1 and 2.

FIGS. 1-3 show a reading assistance device in the form of a pair of glasses 10 having a frame 12 for supporting left and right lenses 14, 15 in front of the eyes of a user thereof. In conventional manner, the frame 12 includes left and right temples 16, 17 attached at front ends by means of hinges 18 (FIGS. 2 and 3) to opposite sides of a frame front 19 having a central bridge 20 connecting left and right lens-mounting rim portions 22, 23. Nose pads 24 (FIG. 2) are provided for supporting bridge 20 comfortably on the user's nose; and bowed end pieces 25 are provided at the distal ends of the temples 16, 17 to support the temples 16, 17 on the user's ears.

In accordance with the invention, the lenses 14, 15 are made opaque except at slits 26, 27 which are transparent and extend horizontally, centrally from the bridge across the lenses 14, 15 to positions just beyond the pupils of a wearer looking straight ahead.

The lenses 14, 15 may, for example, be ordinary plain or prescription glass or plastic lenses 28 that are coated with a black pigment or other non-light transmitting, opaque substance 29 (see FIG. 3) except for narrow, horizontal strips corresponding to the slits 26, 27, thereby leaving just the uncovered slit portions of the lenses unobstructed. The slits 26, 27 may, for example, be dimensioned to be approximately one inch in length and one-eighth inch in height, and be located so that they will be over the pupils of the eyes of a wearer looking straight ahead. Thus, when reading, the wearer will be permitted to view just those lines of text which fall within the unobstructed focused field of view, and blurred lines of text and other distractions in the peripheral field of view will be suppressed.

The view suppression can be further enhanced by providing the glasses 10 in wraparound form or by using side view-shielding temples 16, 17, as shown, which are wide enough proximate the front of the wearer's face to eliminate side view distractions.

While such peripheral view suppression will reduce nonrelevant text and other external distractions, thereby conserving eye energy and increasing concentration, the eyes natural response to such "blackening"

effect will be to crave light. Light deprivation due to reduced illumination caused by blocking images caused by light from unfocused peripheral subject matter can cause headaches, and may even nullify the decreased distraction and increased concentration advantages brought about by the peripheral view suppression. Thus, in accordance with the invention, means are provided to compensate for such light reduction.

This can be done by rendering the material of frame 12 and the non-slit portions of the lenses 14, 15 translucent, so that they are sufficiently opaque to prevent the transmission therethrough of defined images but, nevertheless, are capable of transmitting "white" light background illumination. In the preferred form, however, the frame 12 is made of totally non-light transmitting material and self-illuminating means is provided on the inside of lenses 14, 15 over the regions covered by the opaque substance 19. A suitable material for this purpose is a brightly-colored luminescent phosphorescent material 30 (FIGS. 2 and 3). The material 30 provides internal lighting to compensate for the blocked lighting in the peripheral vision of the user. It is recognized that the light deprivation effect can be avoided using other means such as fiberoptic illumination, battery-powered lighting, light-diffusing aperture patterns and the like to serve the same purpose; however, the uniformity of a substance such as a brightly-colored glow-in-the-dark material sold commercially under the brand name Per-Ma-Glo, compensates for the light deprivation in a pleasing way without introducing other distraction.

The material 30 is applied to the inside of the lenses 14, 15 (see FIGS. 2 and 3) in a configuration to surround the slits 26, 27 and to appear in the peripheral fields of view of the eyes. While the illustrated slitted octagonal configuration has been found suitable; other arrangements are also possible. It may, for example, be desired to completely cover the entire non-slotted opaque regions of the inside of the lenses 14, 15 and, optionally, also cover internal portions of the frame 12. The Per-Ma-Glo material is a self-illuminating non-toxic material which, when charged with a concentrated light beam, will emit a background illumination glow of "white" light for several hours.

The operation of the device of FIGS. 1-3 can be understood with reference to the schematic views shown in FIGS. 4A, 4B and 5.

FIG. 4A shows a page of text 40 as it appears to a reader thereof. As the page is read, the reader's eyes move line to line, from left to right, down the page. At any moment, a central field of view 41 (indicated by two intersecting circles shown in dot-dashed lines) is in focus and is being concentrated on for comprehension. The remainder of the text on the page and objects off the page elsewhere in the room are perceived as unfocused images in the peripheral field of view. Such peripheral images detract from concentration on the focused text 41, thereby interfering with reading fluency.

With the reading assistance device 10 in place over the reader's eyes, the slits 26, 27 block the admission of light from the page to the eyes, except from a region 42 encompassing the focused text 41. Thus, with the glasses 10 in place, the text 40 at any one moment appears to the reader as shown in FIG. 4B. As indicated, light forming the unfocused peripheral images in FIG. 4A has been blocked by the opaque material 29 of the glasses 10 (see also FIG. 5). In order not to deprive the eyes of the light from the blocked peripheral images, however, substitute "white" light is supplied to the peripheral vision by the brightness of the color or glow of the material 30. The uniformity and lack of definition of the material 30 in the peripheral view 44 (FIG. 5) supplies light to the eyes in place of the blocked light, without causing distraction.

The utility of the invention has been determined in a study conducted with 50 students, made up of two groups of 25 students each, all of which had IQs of 90-109. All were suffering from some kind of reading disorder or deficiency which put them at least two and one-half years behind their age group peers in public schools. The students were required to attend one hour of therapy twice per week. If a session was missed, it was made up. The Group 1 students attended sessions for remedial therapy but were not given internally illuminated, peripheral vision suppression glasses 10, like those described above. Group 2 students attended similar remedial reading therapy sessions, but were supplied with the reading assistance glasses 10, along with detailed instructions on how to use them. Those given the glasses were permitted to use them at home, as well. Accurate records were kept in order to determine the progress, or lack of it, of the students in each group.

As shown in the graph of FIG. 6, at the end of 36 weeks, the Group 1 students (i.e., those receiving the treatment without the special glasses 10) went from a group grade point average of 1.86 (corresponding to a "D+") to a group average of 2.6 (corresponding to a "C+"). The Group 2 students (i.e. those who used the glasses 10) went from a group average of 1.58 (corresponding to a "D+"), which was lower than that of Group 1, to a group average of 3.08 (corresponding to a "B"). It is believed that the glasses 10 were responsible for the difference in success. They reduced the strain placed on the sensory-neural pathways, thereby reducing eye fatigue, increasing concentration, increasing comprehension, and allowing the students who used them to read with greater fluency for prolonged periods of time. This had a side advantage of resulting in greater self-confidence and greater self-esteem for the students, which had a very powerful positive effect on their overall academic performance.

As can be seen from the foregoing, the invention provides a device and method which has been demonstrated to give beneficial remedial assistance to school children with poor reading skills. The same mechanism is also useful for assisting others, both young and old, to read more efficiently. The glasses are designed to limit the amount of text material exposed to the user, thereby reducing outside distractions, conserving eye energy and generally increasing productive eye usage. The result is increased reading speed and greater overall comprehension. The glasses do much of the work for the eyes which makes possible more enjoyable and rewarding reading for longer periods of time.

The lenses 14, 15 can be clear or prescription lenses providing, for example, a magnification of 1.62 for readers needing some magnification. For students and/or adults wearing contacts or who do not need prescription glasses, magnification is unnecessary. Different frame sizes can be provided for different sizes of user. The fit of the frames can be adjusted for comfort and the distance from the glasses to the material being read varied to suit the needs of a particular individual.

Those skilled in the art to which the invention relates will appreciate that the use of separate lens elements 14, 15 can be dispensed with, if desired, and the slits 26, 27 formed directly in the frame 12 itself. The apertures of slits 26, 27 can be covered with a light transmitting material that permits images of the framed text to be viewed through it, or can be left open and uncovered. The use of temples is preferred but not required. It will be evident that there are other substitutions and modifications that can also be made to the described embodiments, without departing from the spirit and scope of the invention as described by the claims below.

What is claimed is:

1. A device for reducing distraction caused by unfocused peripheral images and for increasing concentration on focused text during reading, without depriving a reader's eyes of light otherwise received from said peripheral images, said device comprising:
   slit means for admitting light to the eyes from said focused text, while blocking the admission to the eyes of light forming said unfocused peripheral images;
   illumination means associated with said slit means for supplying white light peripherally to the eyes in place of said blocked light; and
   means mounting said slit means and illumination means before the eyes of the reader, said mounting means comprising a front portion supporting said slit means and illumination means, and left and right portions connected to said front portion and supportable about the reader's head.

2. A device as in claim 1, wherein said mounting means comprises a frame, said front portion comprises a front of said frame having a bridge portion supportable on the reader's nose, and said left and right portions comprise left and right temples connected to said front and supportable respectively on the reader's ears.

3. A device as in claim 2, wherein said slit means comprises elongated horizontal slits located on said front on respective left and right sides of said bridge; and said front includes left and right opaque portions respectively surrounding said slits.

4. A device as in claim 3, wherein said mounting means further comprises left and right lenses supported on said front, said opaque portions comprise opaque portions of said lenses, and said slits comprise clear portions of said lenses.

5. A device as in claim 4, wherein said lenses comprise conventional prescription lenses, and said opaque portions are formed by coating said lenses at said opaque portions with a non-light transmitting substance.

6. A device as in claim 4, wherein said slits are located centrally of said lenses and extend from the bridge to positions just beyond the positions of the pupils of the reader when the reader is looking straight ahead.

7. A device as in claim 3, wherein said temples are side view-shielding temples which are wide enough proximate the front of the reader's face to block the admission of light from the sides.

8. A device for reducing distraction caused by unfocused peripheral images and for increasing concentration on focused text during reading, without depriving a reader's eyes of light otherwise received from said peripheral images, said device comprising:
   slit means for admitting light to the eyes from said focused text, while blocking the admission to the eyes of light forming said unfocused peripheral images;
   illumination means, comprising a phosphorescing substance, associated with said slit means for supplying white light peripherally to the eyes in place of said blocked light; and
   means mounting said slit means and illumination means before the eyes of the reader.

9. A device for reducing distraction caused by unfocused peripheral images and for increasing concentration on focused text during reading, without depriving a reader's eyes of light otherwise received from said peripheral images, said device comprising:
   a frame including a front having a bridge portion supportable on the reader's nose, and left and right temples connected to said front and supportable respectively on the reader's ears; said frame having elongated horizontal slits located on said front on respective left and right sides of said bridge for admitting light to the eyes from said focused text, and said frame further including left and right opaque portions respectively surrounding said slits for blocking the admission to the eyes of light forming said unfocused peripheral images; and
   illumination means located on said frame for supplying white light peripherally to the eyes in place of said blocked light.

10. A device as in claim 9, wherein device further comprises lenses mounted on said front, and said slits comprise apertures formed in said lenses.

11. A device as in claim 9, wherein said illumination means comprises a luminescent material applied to an inside of said front surrounding said slits.

12. A device as in claim 9, wherein said material is a brightly-colored material that glows after prior exposure to light.

13. A device as in claim 9, wherein said device further comprises left and right lenses supported on said front, said opaque portions comprise portions of said lenses covered with a coating of opaque material, and said slits comprise portions of said lenses not covered by said coating.

14. A device as in claim 13, wherein said lenses are prescription lenses with a magnification factor.

15. A device as in claim 13, wherein said illumination means comprises a brightly-colored, glow-in-the-dark luminescent material applied to said lenses surrounding said slits.

16. A method for reducing distraction caused by unfocused peripheral images and for increasing concentration on focused text during reading, without depriving a reader's eyes of light otherwise received from said peripheral images, said method comprising the steps of:
   providing an apertured member comprising a front, and mounting means connected to said front for mounting said front to the reader's head; said front including slit means for admitting light, blocking means surrounding said slit means for blocking light, and illumination means located internally on said front for supplying white light in place of said blocked light;
   reading a text;
   covering the eyes with said apertured member with said mounting means mounting said front to the reader's head before the eyes of the reader;
   admitting light to the eyes from focused portions of said text through said slit means, while blocking the admission to the eyes of light forming said unfocused peripheral images by said blocking means; and supplying white light peripherally to the eyes from said illumination means in place of said blocked light.

17. A method as in claim 16, wherein the apertured member, provided in said providing step, comprises a frame including said front and having a bridge portion supportable on the reader's nose; said mounting means comprises left and right temples connected to said front and supportable respectively on the reader's ears; said slit means comprises elongated horizontal slits located on said front on respective left and right sides of said bridge portion; and said blocking means comprises left and right opaque portions respectively surrounding said slits.

18. A method as in claim 17, wherein said illumination means comprises a bright luminescent material located on a inside of said opaque portions.

19. A method as in claim 18, wherein said slits are formed by lenses mounted on said frame.

* * * * *